US005381525A

United States Patent [19]

Iguchi

[11] Patent Number: 5,381,525

[45] Date of Patent: Jan. 10, 1995

[54] GRAPHIC MOVEMENT CONTROL SYSTEM ON DISPLAY SCREEN

[75] Inventor: Katsumi Iguchi, Kawasaki, Japan

[73] Assignee: Fujitsu Limited, Kawasaki, Japan

[21] Appl. No.: 5,565

[22] Filed: Jan. 19, 1993

[30] Foreign Application Priority Data

Jan. 16, 1992 [JP] Japan .................................. 4-006002

[51] Int. Cl.[6] .............................................. G06F 15/60

[52] U.S. Cl. ..................................................... 395/162

[58] Field of Search ............... 345/113, 119, 121, 123, 345/135, 147, 150, 163, 167, 173, 125, 157; 358/500, 530; 364/709-712, 735; 395/101, 109, 119, 130, 135, 152, 155, 159, 161, 500, 162, 163, 164, 165, 166

[56] References Cited

U.S. PATENT DOCUMENTS 4,688,181 8/1987 Cottrell et al. ...................... 395/155
5,189,633 2/1993 Bonadio ......................... 364/709.12

OTHER PUBLICATIONS

IBM Tech. Disclosure Bull., vol. 24, No. 2, Jul. 1981, pp. 1072–1074; D. F. Bantz et al; "Strategy for Fast Interaction with a Complex Display".

IBM Tech. Disclosure Bull., vol. 25, No. 2, Jul. 1982, p. 469; M. N. Day; "Progressive Visibility Function for a Display Station Cursor".

Foley, J. D., Van Dam, A., Fundamentals of Interactive Computer Graphics, pp. 80, 81, 208, 209, 212.

*Primary Examiner*—Mark R. Powell
*Assistant Examiner*—U. Chauhan
*Attorney, Agent, or Firm*—Staas & Halsey

[57] ABSTRACT

A graphics movement control system on a display screen controls the intervals between drawing graphics according to the number of picture elements of the graphics when the graphics are moved on a display screen using a pointing device such as a mouse, etc. in an editor for editing a block diagram and a circuit diagram through a workstation, etc. When graphics displayed on a display screen are moved by a pointing device, the drawing intervals between in moving the graphics are controlled. Thus, the number of times to draw the graphics can be controlled between the starting point and the ending point of the movement on the display screen. That is, the complexity of the graphics is determined by the number of picture elements forming the graphics. The intervals between drawing graphics on the display screen are lengthened for those having a large number of picture elements so that the number of times to draw the graphics up to the final movement position is reduced. A quick movement of a pointing device can be traced even for complicated graphics by reducing the number times to draw graphics up to the final movement position.

5 Claims, 5 Drawing Sheets

GRAPHIC MOVEMENT CONTROL SYSTEM ON DISPLAY SCREEN

BACKGROUND OF THE INVENTION

1. Field of the Invention

The present invention relates to a graphics movement control system on a display screen which controls the intervals between drawing graphics according to the number of picture elements of the graphics when the graphics are moved on a display screen using a pointing device such as a mouse, etc. in an editor for editing a block diagram and a circuit diagram through a workstation, etc.

2. Description of the Related Art

When an editor processes a circuit diagram, etc. on a display screen, graphics are moved using a pointing device to any position on a display screen to perform an editing process easily and simply.

Converting the movement of a mouse to the movement of an object (graphics) on a display is generally referred to as "dragging".

In dragging graphics, if there is a time difference large enough to make an operator nervous between the movement of a mouse anti the actual movement on a display screen, then operability goes down and a malfunction may occur when another editing process is performed at any point until the movement on the display is completed.

Accordingly, in dragging graphics, graphics on a screen must be appropriately and visually moved in real time with the movement of a mouse.

With a conventional editor, specified graphics to be moved are moved unmodified when dragging graphics.

That is, as shown in FIG. 1 (PRIOR ART), when graphics 2 displayed on a display screen 1 are moved from position A1 to position A9 along a locus 3 of a mouse, then the graphics 2 at position A1 are first drawn at position A2 corresponding to the movement of the mouse, drawn at position A3, and then at position A3, A4, . . . Thus, the graphics are drawn sequentially at all sampling points of the mouse, and finally at position A9.

As described above, when the graphics 2 at position A1 shown in FIG. 1 are moved, the graphics to be moved are drawn sequentially at coordinate positions (A1, A2, . . . , A9) of the mouse at each sampling time, and are finally moved to the last position A9.

However, in the movement method described above, if complicated graphics composed using a number of dots and lines, that is, graphics composed of a number of picture elements, are to be moved, then the CPU, etc. incurs a large load, and the movement of the graphics cannot be traced on the screen in real time at the moving speed of the mouse. The reason is that it takes a long time to draw complicated graphics at each sampling position. Therefore, if the mouse is moved in a zigzag way, for example, the graphics must trace the zigzag movement. In this case, the graphics are further delayed in reaching the target position while following the movement of the mouse, resulting in the reduction of operability and a malfunction when another editing process is performed at any point until the movement is completed.

To prevent the above described problems, some editors redraw entire graphics object when graphics to be moved are selected, drag them as simplified graphics by drawing only the outline of the entire graphics. However, since some graphics are complicated in their outlines themselves, this method is not practical at all.

SUMMARY OF THE INVENTION

The present invention aims at moving graphics in real time with the movement of a pointing device such as a mouse, etc. by controlling the total time of drawing graphics by making the intervals between drawings of graphics during the graphics movement depend on the complexity of graphics to be moved on a display screen, thereby improving the operability and efficiency of an editing process.

The present invention is used in a system for moving graphics on a display screen using a pointing device such as a mouse, etc. in an editor for editing a block diagram or a circuit diagram in a workstation, etc.

To attain the above described object, the present invention moves graphics displayed on a display screen to a target position on the display screen using a pointing device such that the total time needed for drawing graphics is reduced by making the intervals between drawings of graphics longer when the graphics to be moved are complicated. The complexity of graphics can be determined by the number of picture elements forming the graphics. The number of the picture elements is assigned a maximum value, and graphics having a number of picture elements exceeding the maximum value are treated the same as those having the maximum value of picture elements.

Such control enables complicated graphics having a large number of picture elements to be traced in real time with the movement of the pointing device. Thus, an efficient editing process is guaranteed when circuit diagrams or block diagrams are edited on the display screen. At this time, by determining a maximum value for the number of picture elements realizes the control of optimum drawing intervals for an available computer system such as a workstation can be achieved.

DETAILED DESCRIPTION OF THE PREFERRED EMBODIMENT

Figure 1:
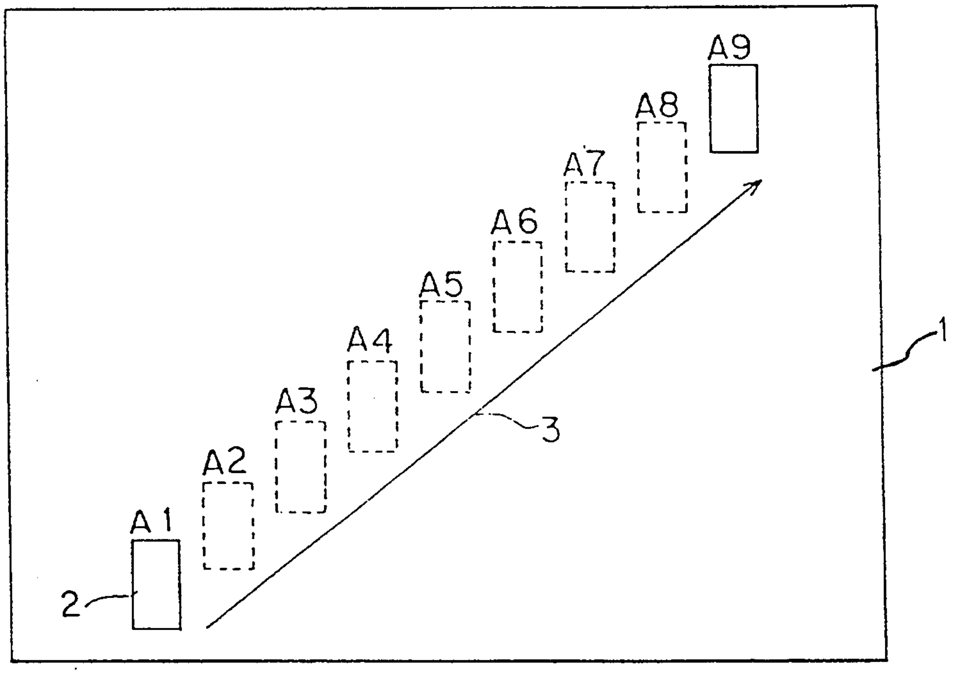
Fig. 1 PRIOR ART
FIG. 1 shows how to move graphics by a prior art technology.
Figure 2:
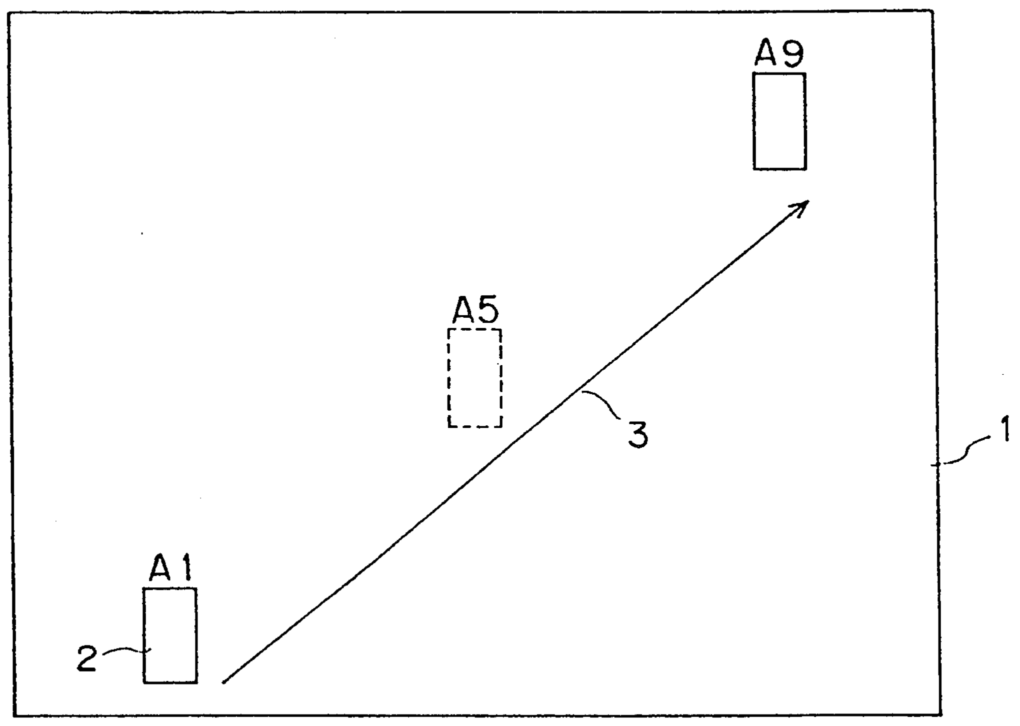
FIG. 2 shows the principle of the present invention.

FIG. 2 shows the principle of the present invention. In FIG. 2, if a unit corresponds to one shown in FIG. 1, the same unit number is used. According to the present invention, when the graphics are moved along the locus 3 of the mouse, the time intervals between drawings of graphics are controlled and the total number of drawings of the graphics up to the final movement position can be controlled depending on the number of picture elements of graphics drawn on a display screen, that is, the complexity of the graphics.

That is, graphics having a great number of picture elements referred to as complicated graphics are drawn with the drawing intervals lengthened as compared with those having a smaller number of picture elements referred to as simple graphics. Thus, the total number of times to draw graphics can be controlled appropriately.

That is, the locus of base points of graphics on the display screen from time t1 to time t2 can be represented as follows.

$$Xi+1=Xi+X\text{disp}(t1+i\cdot\Delta t)$$

$$Yi+1=Yi+Y\text{disp}(t1+i\cdot\Delta t)$$

with

Xi: a coordinate of the base point of graphics on the display at time ti (X coordinate)

Yi: a coordinate of the base point of graphics on the display at time ti (Y coordinate)

Xdisp: the movement in the X-axis direction on the display between two given times Ydisp: the movement in the Y-axis direction on the display between two given times Δt: the time intervals in sampling the movements of a mouse where i is calculated as follows.

$$0 \leq i \leq \left[\frac{t2-t1}{\Delta t}\right] \tag{2}$$

Then, equation i=(t2−t1)/Δt is substituted for equation (1) as follows.

$$X_i+1=X_i+X\text{disp}(t2)$$

$$Y_i+1=Y_i+Y\text{disp}(t2) \tag{3}$$

In equation (3), Xdisp (t2) and Ydisp (t2) indicate the movement from time t1 to time t2. That is, they indicate the coordinates for time t1+t2 for the X and Y coordinates of the graphics.

To lengthen the time intervals between drawings of graphics, the value of the above described i is calculated as follows.

$$i=P\cdot j \tag{4}$$

where P indicates an integer proportional to the number of picture elements of graphics.

Therefore, j in equation (4) can be calculated as follows.

$$j=0, 1, 2, \ldots \left[\frac{t2-t1}{P\cdot\Delta t}\right] \tag{5}$$

In equation (5), (t2−t1)/P·Δt indicates the number of times to draw graphics from time t1 to time t2. Δt is a fixed value. Therefore, the smaller the number of picture elements is (the smaller P is), the larger the number of times for drawing graphics is and the shorter the time intervals between drawings become. In contrast, the larger the number of picture elements is (the bigger P is), the smaller the number of times for drawing graphics is and the longer the time intervals between drawings become. If P is large enough (the number of picture elements is large enough), the value of (t2−t1)/P·Δt equals 0. Therefore, P is assigned a maximum value if the number of picture elements exceeds a fixed value.

As described above, complicated graphics having a large number of picture elements are drawn after longer time intervals. For example, graphics 2 at position A1 are drawn at position A5 with the drawings at sampling points A2, A5, and A4 shown in FIG. 2 omitted as shown in FIG. 1. Likewise, sampling points A6, A7, and A8 are omitted and the graphics are drawn at the target movement position A9.

Thus, complicated graphics are drawn less number of times by lengthening the time intervals between drawings. Therefore, the necessary time for drawing graphics can be considerably reduced, and the quick movement of a mouse can easily be traced in real time.

By contrast, comparatively simple graphics having a smaller number of picture elements require a short time for drawing at each sampling point. Therefore, the time intervals between drawings can be short with the movement of a mouse successfully traced.

The number of picture elements of target graphics to be moved can be calculated in quantity according to another program. The time intervals between drawings of graphics can be controlled depending on the number of picture elements. Thus, complicated graphics having a large number of picture elements are drawn less number of times by lengthening the time intervals between drawings of the graphics. Thus, the movement of a mouse can be easily traced in real time, and the graphics can be dragged without reducing the operability.

Figure 3:
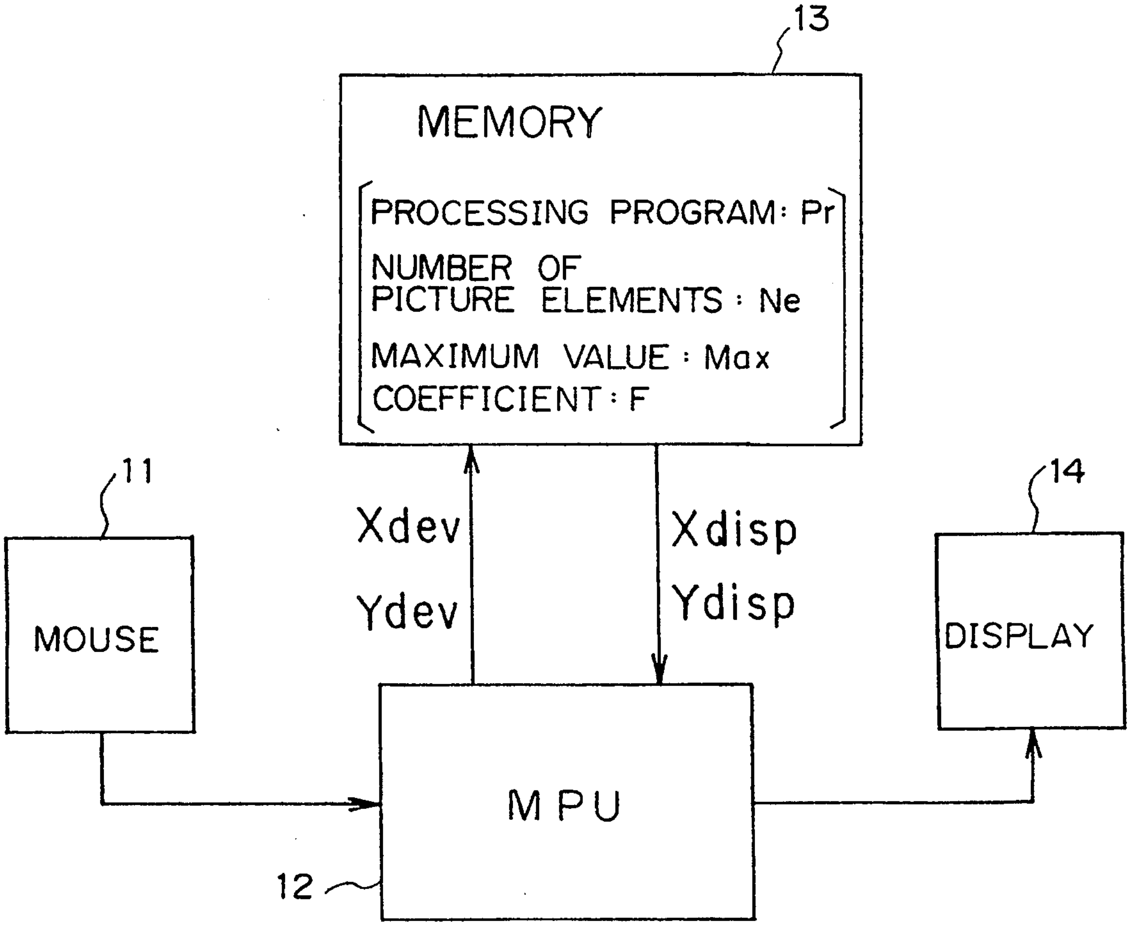
FIG. 3 shows the system configuration for explaining the embodiment of the present invention.
Figure 4:
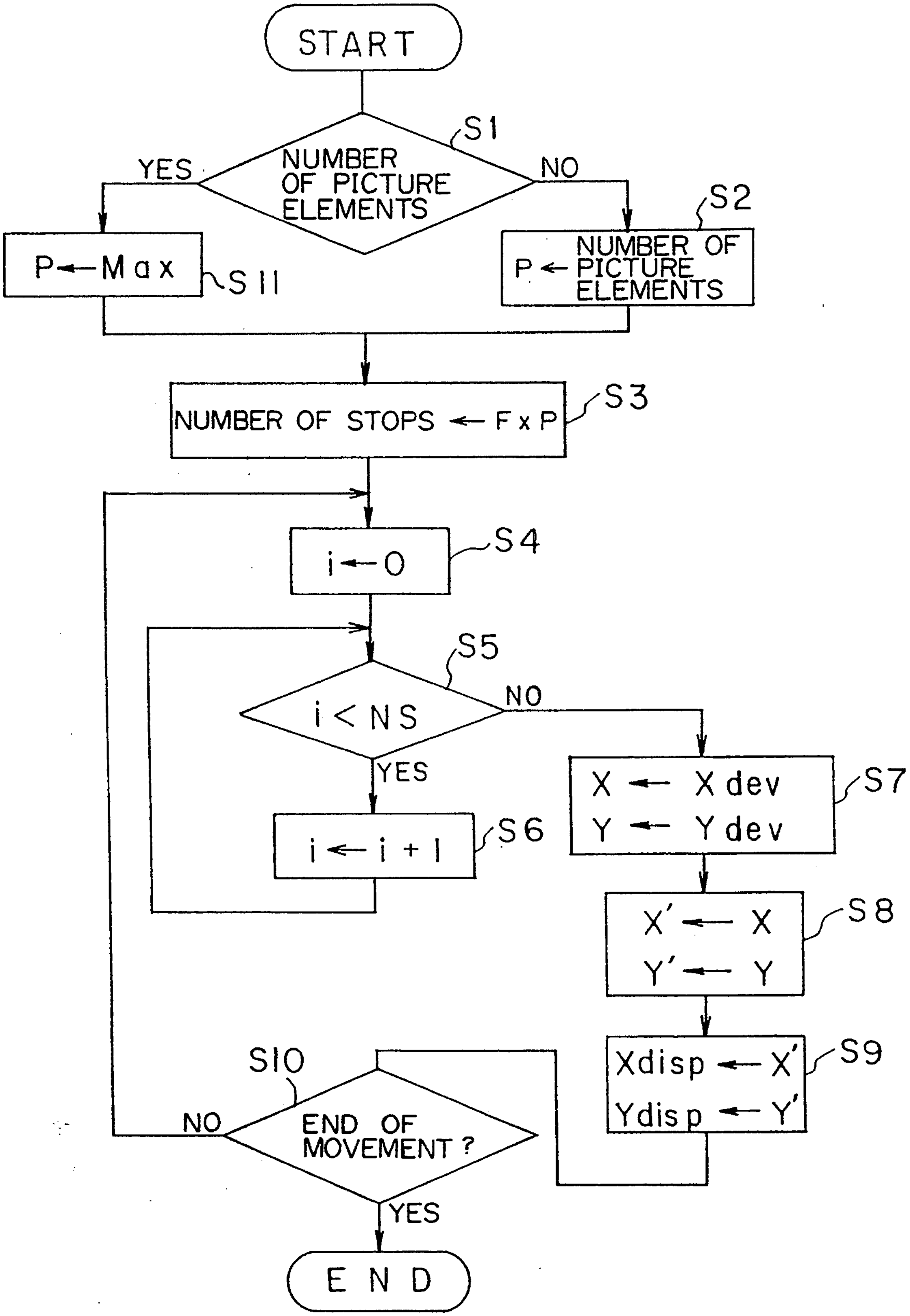
FIG. 4 is a flowchart for explaining the operation of the embodiment.
Figure 5:
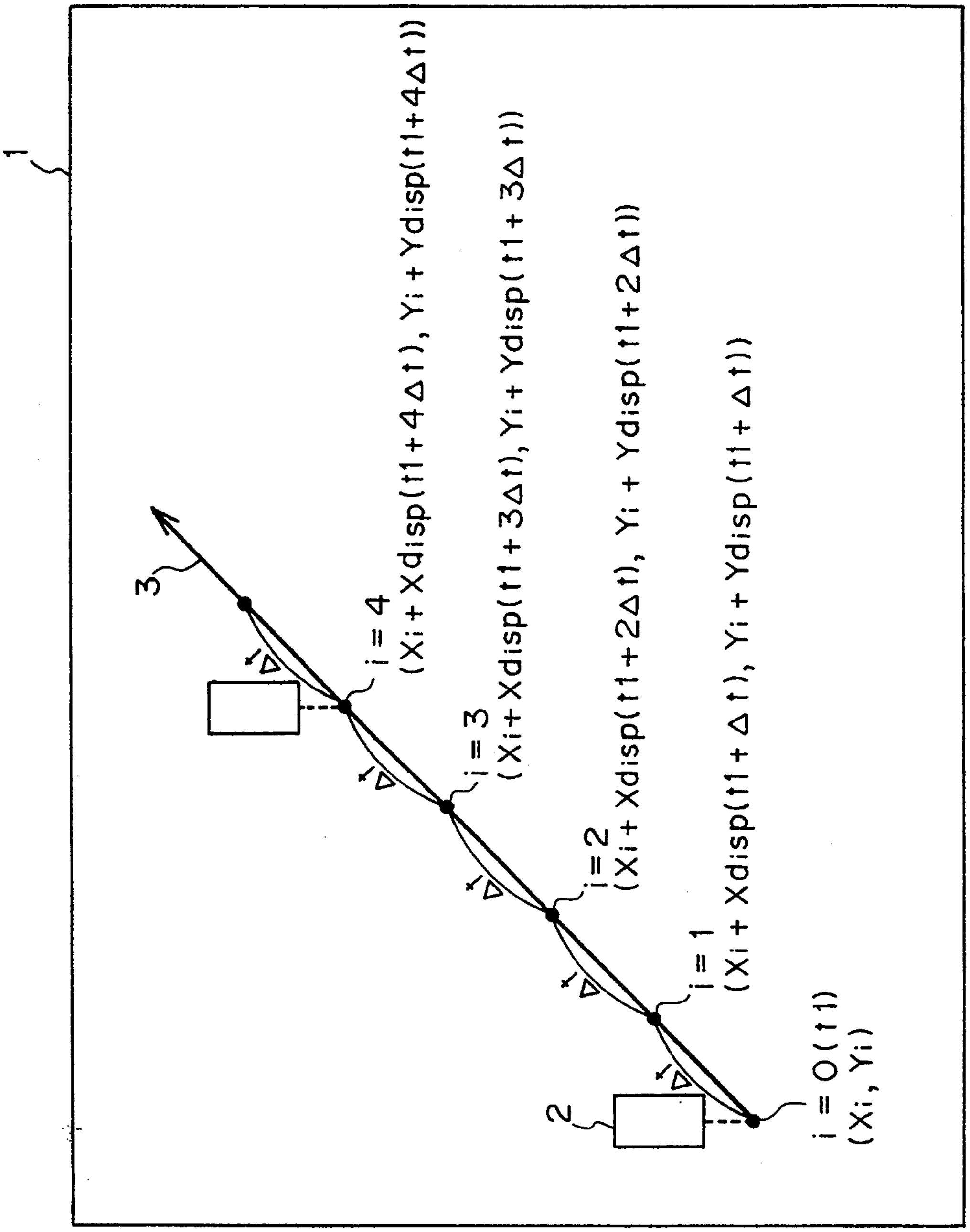
FIG. 5 shows how to move graphics on a display screen according to the embodiment of the present invention.

The principle of the present invention is described below by referring to FIGS. 3–5. In the system configuration shown in FIG. 3, 11 is a mouse; 12 is a micro processing unit, 13 is a memory, axed 14 is a display.

The memory 13 stores a processing program Pr, the number of picture elements Ne of graphics to be moved, the maximum value MAX of the number of picture elements of the graphics, a coefficient F, etc. The number of picture elements Ne, the maximum value MAX, and the coefficient F can be obtained through another program.

The above described coefficient F is set for each user, and determined depending on the type of application software and a work station to be used.

The input data from the mouse 11 are applied to the MPU 12, and the MPU 12 obtains coordinates to draw graphics according to the number of picture elements Ne of graphics to be moved, the maximum value MAX of the number of picture elements of the graphics, the coefficient F, etc., and then draws the graphics at the corresponding coordinates on the display 14.

The general description is given below by referring to the flowchart shown in FIG. 4. First, it is determined whether or not the number of picture elements Ne is larger than the maximum value MAX (step S1). If it is smaller than the maximum value, the integer P proportional to the number of picture elements is calculated (step S2). The number of stops NS in drawing graphics is obtained by multiplying the integer P by the above described coefficient F (step S3). The multiplication of the integer P by the coefficient F is performed to synchronize the drawing position with the sampling points of the mouse 11 when the drawing intervals are controlled. The number of omitted points in drawing graphics is determined by the number of stops NS in drawing the graphics. For example, if NS=3, the graphics are drawn at the 4th sampling point and the preceding 3 sampling points of the mouse 11 are skipped.

Next, if i=0 (step S4), the initial position of graphics to be moved is the position Xi, Yi on the display screen at time t1. In this state, it is determined whether or not i is greater than the number of stops NS in drawing the graphics (step S5). If i is smaller than the number of stops NS, a process using the value i=i+1(step S6) is repeated until i exceeds the number of stops NS in drawing the graphics, where the MPU 12 obtains the X and Y coordinates of the moved mouse 11 (step S7) according to position Xdev and Ydev of the mouse 11 on the device at that time. Then, after converting the coordinates to those X', Y' for the program (step S8), the coordinates X', Y' are outputted as the coordinates Xdisp, Ydisp on the screen of the display 14 (step S9). Thus, the graphics are drawn at the sampling points of the mouse 11 on the screen of the display 14.

Then, it is determined whether or not the graphics have been moved to the final position (step S10). If not, control is passed to step S4.

i=0 is applied in step S4, determination in step S5 is made (as to whether or not i is greater than the number of stops NS in drawing graphics) based on the above described sampling points, and the graphics are drawn again on the screen of the display 14 when i exceeds the number of stops NS in drawing the graphics.

If the drawing position is the final movement position, then the movement of the graphics is completed at this point, and the next graphics to be moved are selected and processed likewise.

If the number of picture elements of the graphics to be moved is exceedingly large and the number of picture elements is larger than a predetermined maximum number MAX (step S1), then the maximum value MAX is substituted for the integer P (step S11), and is multiplied by the coefficient F to obtain the number of stops in drawing the graphics (step S4), followed by the process described above.

To clearly explain the embodiment, the number of stops NS in drawing graphics is assumed to be 3, for example.

In the above described flowchart (FIG. 4), after the process (step S3) in which the number of stops in drawing graphics is assumed to be 3, a step is processed with i=0 (step S4), and then the process is repeated with i incremented by one, that is, i=1, i=2, . . . Each time the process is performed, it is determined whether or not i is larger than 3, that is, the number of stops in drawing graphics.

When i=0, the graphics are located at the coordinates Xi, Yi on the display at time t1 according to the above described equation (1). When i=1, the position of the mouse 11 on the display is moved by 1 sample time Δt in the X and Y directions from the position when i=0, that is, at time t1 according to equation (1). When i=2, the position is moved by sample time 2 Δt in the X and Y directions from the position when i=0, that is, at time t1. These are shown in FIG. 5.

Since the number of stops NS in drawing graphics is "3", i<NS if i=0, i=1, i=2, and i=3. If i=4, then control is passed to step S7 in the flowchart in FIG. 4. That is, the positions X and Y are obtained for the current position of the mouse 11 (step S7). The results are converted to the coordinates X', Y' for the program (step S8), and then the coordinates X', Y' are outputted as the coordinates Xdisp, Ydisp on the display.

That is, graphics are drawn on the screen of the display for the sampling point of the mouse 11 when i=4. If this is explained by referring to FIG. 5, then the position of the graphics is moved by 4 sample time 4 Δt in the X and Y directions from the position when i=0, that is, at time t1 according to the above described equation (1), and the graphics are drawn at this position. That is, they are not drawn at the first sample time Δt, the second sample time 2 Δt, or the third sample time 3 Δt, but are drawn at the fourth sample time Δt.

It is determined whether or not the position of the graphics is the final movement position (step 10). If not, control is returned to step S4. Based on the point of drawing the graphics the processes from step S4 to step S6 are performed repeatedly as described above. Each time the process is performed, determination is made as to whether or not i<NS. The moment i exceeds NS, the graphics are drawn as described above.

Thus, the graphics are drawn at every fourth sample time 4 Δt.

As described above, in the present embodiment, the number of sampling times is controlled according to the product obtained by multiplying the number of picture elements of target graphics to be moved by a predetermined coefficient. Since the number of times to draw is reduced for graphics having a large number of picture elements, the necessary time required for drawing graphics on the screen of the display in moving the graphics can be greatly reduced for complicated graphics having a large number of picture elements, and thus the movement of the mouse can be traced in real time. Besides, the control of sampling time can be performed for each workstation to be used by determining a maximum value of the number of picture elements of graphics. Furthermore, modifying the above described coefficient can appropriately adjust the sampling time. Thus, general-purpose control can be performed for correctly moving graphics depending on users or systems to be used.

Thus, according to the present invention, complicated graphics having a large number of picture elements are controlled such that drawing intervals are lengthened during the movement of graphics depending on the number of picture elements of the graphics to be moved on the display. Therefore, the graphics are moved in real time with the movement of a pointing device when the graphics are moved by the pointing device such as a mouse, etc. Thus, the invention is featured by a high operability and an efficient editing operation performed when a circuit diagram or a block diagram are edited on the display.

What is claimed is:

1. A graphic movement control system comprising:

means for moving graphics displayed on a display screen to a target position on said display screen according to a movement of a pointing device;

memory means for storing memory information including at least one of a number of picture elements of said graphics to be moved, a maximum value for a predetermined number of picture elements, and a predetermined coefficient determined based on a computer system to be used in a current graphic movement operation; and means for determining an amount of time intervals between drawings of said graphics on said display screen being moved to said target position by said moving means, based on a complexity level of said graphics to be moved determined according to said memory information.

2. The graphics movement control system for moving graphics displayed on a display screen according to claim 1, wherein said determining means determines to lengthen the amount of said time intervals between said drawings of said graphics on said display screen during the movement of said graphics if said graphics to be moved are complicated.

3. The graphics movement control system for moving graphics displayed on a display screen according to claim 1, wherein said determining means determines said complexity level of said graphics to be moved according to the number of picture elements forming said graphics, and determines said amount of time intervals between said drawings of said graphics according to a value proportional to said number of picture elements.

4. The graphic movement control system for moving graphics displayed on a display screen according to claim 1, wherein said determining means further determines a position of drawing said graphics when said determining means determines said amount of time intervals according to a product obtained by multiplying a value proportional to said number of picture elements by said predetermined coefficient to synchronize the position with a sampling point of said pointing device, and said determining means further determines a number of stops in said drawings of said graphics to thereby determine sampling points at which said graphics are drawn after skipping a portion of said sampling points depending on the number of picture elements.

5. The graphics movement control system for moving graphics displayed on a display screen according to claim 1, wherein:

said determining means determines said graphics having the number of picture elements exceeding the maximum value of a predetermined number of picture elements and assigns drawing intervals which correspond to the maximum value of picture elements.

* * * * *